US012237505B2

(12) United States Patent
Masahara et al.

(10) Patent No.: US 12,237,505 B2
(45) Date of Patent: Feb. 25, 2025

(54) POSITIVE ELECTRODE ACTIVE MATERIAL FOR NONAQUEOUS ELECTROLYTE SECONDARY BATTERIES, METHOD FOR PRODUCING POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Koh Masahara, Hyogo (JP); Kaoru Nagata, Osaka (JP); Takaya Tochio, Osaka (JP); Taizou Sunano, Tokushima (JP); Akihiro Kawakita, Hyogo (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 439 days.

(21) Appl. No.: 16/086,225

(22) PCT Filed: Jan. 26, 2017

(86) PCT No.: PCT/JP2017/002648
§ 371 (c)(1),
(2) Date: Sep. 18, 2018

(87) PCT Pub. No.: WO2017/169043
PCT Pub. Date: Oct. 5, 2017

(65) Prior Publication Data
US 2020/0295366 A1    Sep. 17, 2020

(30) Foreign Application Priority Data
Mar. 30, 2016 (JP) ................. 2016-067044

(51) Int. Cl.
*H01M 4/00* (2006.01)
*C01G 53/42* (2025.01)
(Continued)

(52) U.S. Cl.
CPC ............ *H01M 4/525* (2013.01); *C01G 53/42* (2013.01); *H01M 4/366* (2013.01);
(Continued)

(58) Field of Classification Search
CPC ........ H01M 4/525; H01M 4/366; H01M 4/52; H01M 4/405; H01M 4/32; H01M 4/382;
(Continued)

(56) References Cited

U.S. PATENT DOCUMENTS 9,793,540 B2 * 10/2017 Kawai ................ H01M 4/0471
10,256,461 B2 * 4/2019 Mizawa ................ C01G 53/50
(Continued)

FOREIGN PATENT DOCUMENTS

CN    104835950 A    8/2015
JP    2004-175609 A    6/2004
(Continued)

OTHER PUBLICATIONS

Machine translation of JP2009016302 originally published to Fujisawa et al. on Jan. 22, 2009. (Year: 2009).*
(Continued)

*Primary Examiner* — Nicholas P D'Aniello
(74) *Attorney, Agent, or Firm* — WHDA, LLP

(57) ABSTRACT

This positive electrode active material for non-aqueous electrolyte secondary batteries comprises: lithium transition metal oxide particles; a metal compound which contains a metal element M and adheres to the surfaces of the lithium transition metal oxide particles; and a lithium metal compound which contains lithium (Li) and the metal element M and adheres to the surfaces of the lithium transition metal
(Continued)

oxide particles. In this connection, the metal element M is composed of at least one substance that is selected from among aluminum (Al), titanium (Ti), manganese (Mn), gallium (Ga), molybdenum (Mo), tin (Sn), tungsten (W) and bismuth (Bi).

6 Claims, 1 Drawing Sheet

(51) Int. Cl.
    *H01M 4/36*     (2006.01)
    *H01M 4/525*     (2010.01)
    *H01M 10/0525*     (2010.01)
    *H01M 4/02*     (2006.01)

(52) U.S. Cl.
    CPC ..... *H01M 10/0525* (2013.01); *C01P 2004/84* (2013.01); *C01P 2006/40* (2013.01); *H01M 2004/028* (2013.01)

(58) Field of Classification Search
    CPC ............ H01M 4/483; H01M 10/0525; H01M 2004/028; C01G 53/42; C01P 2004/84; C01P 2006/40
    See application file for complete search history.

(56) References Cited

U.S. PATENT DOCUMENTS

| | | | | |
|---|---|---|---|---|
| 10,454,107 | B2 * | 10/2019 | Niina | H01M 4/131 |
| 2002/0071991 | A1 * | 6/2002 | Kweon | H01M 4/525 |
| | | | | 429/231.1 |
| 2006/0147809 | A1 * | 7/2006 | Amine | H01M 10/0568 |
| | | | | 429/330 |
| 2006/0204849 | A1 | 9/2006 | Saito et al. | |
| 2012/0276446 | A1 * | 11/2012 | Kawai | C01G 51/50 |
| | | | | 429/223 |
| 2013/0309580 | A1 * | 11/2013 | Tomura | H01M 4/624 |
| | | | | 429/304 |
| 2013/0337331 | A1 | 12/2013 | Mori et al. | |
| 2014/0087263 | A1 * | 3/2014 | Matsumoto | C01G 45/1228 |
| | | | | 429/223 |
| 2015/0221933 | A1 * | 8/2015 | Mizawa | H01M 4/131 |
| | | | | 429/223 |
| 2015/0228969 | A1 | 8/2015 | Cho et al. | |
| 2017/0054147 | A1 | 2/2017 | Yokoyama et al. | |
| 2018/0287144 | A1 | 10/2018 | Furuichi et al. | |
| 2019/0207246 | A1 * | 7/2019 | Dahn | H01M 10/0569 |

FOREIGN PATENT DOCUMENTS

| | | | | |
|---|---|---|---|---|
| JP | 2005-166558 | A | | 6/2005 |
| JP | 2006-286614 | A | | 10/2006 |
| JP | 2008-77990 | A | | 4/2008 |
| JP | 2009-16302 | A | | 1/2009 |
| JP | 2009016302 | | * 1/2009 | ............ Y02E 60/10 |
| JP | 2013125732 | A | * 6/2013 | |
| JP | 2015-216105 | A | | 12/2015 |
| JP | 2016-110999 | A | | 6/2016 |
| JP | 2017-134996 | A | | 8/2017 |
| WO | 2012/131779 | A1 | | 10/2012 |
| WO | 2014/049964 | A1 | | 4/2014 |
| WO | 2016/017092 | A1 | | 2/2016 |

OTHER PUBLICATIONS

Machine translation of JP-2013125732-A, obtained Apr. 2022 (Year: 2013).*
International Search Report dated Apr. 25, 2017, issued in counterpart application No. PCT/JP2017/002648 (2 pages).
English Translation of Search Report dated Jan. 13, 2021, issued in counterpart to CN Application No. 201780021349.5. (3 pages).

* cited by examiner

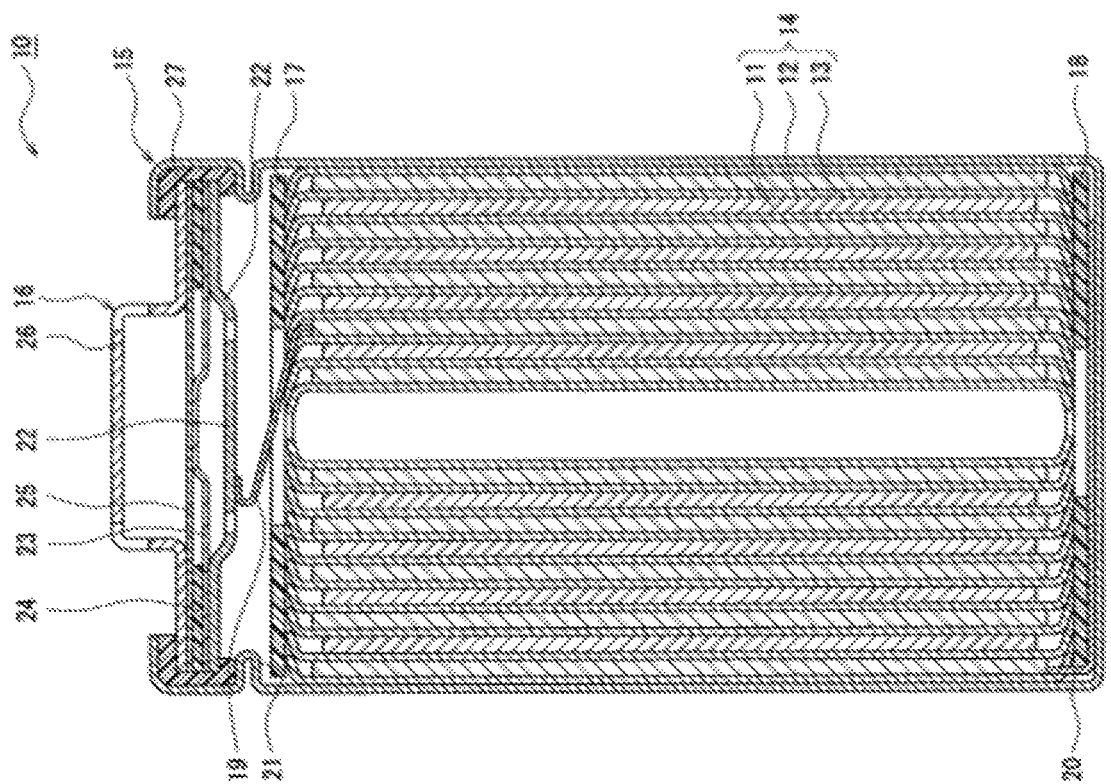

ary batteries, a method for producing a positive electrode active material for non-aqueous electrolyte secondary batteries, and a non-aqueous electrolyte secondary battery.
POSITIVE ELECTRODE ACTIVE MATERIAL FOR NONAQUEOUS ELECTROLYTE SECONDARY BATTERIES, METHOD FOR PRODUCING POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present disclosure relates to a positive electrode active material for non-aqueous electrolyte secondary batteries, a method for producing a positive electrode active material for non-aqueous electrolyte secondary batteries, and a non-aqueous electrolyte secondary battery.

BACKGROUND ART

Lithium transition metal oxide particles constituting a positive electrode active material for non-aqueous electrolyte secondary batteries are synthesized by calcining a mixture of a lithium compound and a transition metal oxide. Part of lithium is lost by volatilization during the calcination, and it is therefore a common practice to use lithium in an amount more than that in accordance with the stoichiometric ratio of a target product. However, the presence of surplus lithium on the surfaces of the lithium transition metal oxide particles increases the amount of gas generated during charge or storage of the battery or the like. Hence, it is necessary to wash the calcined product to remove the surplus lithium.

For example, Patent Literature 1 discloses a positive electrode active material in which fine particles containing tungsten and lithium have adhered to the surfaces of lithium transition metal oxide particles. Patent Literature 1 discloses steps of washing the lithium transition metal oxide particles with water, and filtering and drying the particles.

CITATION LIST

Patent Literature

Patent Literature 1: JP 2015-216105 A

SUMMARY

Incidentally, if the washing of the lithium transition metal oxide particles (calcined product) can be omitted, the need for the steps of filtration and drying will be also eliminated, so that the production costs of the positive electrode active material, the environmental load and the like can be reduced. It is an advantage of the present disclosure to provide a positive electrode active material that can reduce the amount of gas generated during charge or storage of the battery or the like even without washing lithium transition metal oxide particles. Here, although the positive electrode active material in Patent Literature 1 undergoes the washing step, the amount of gas generated during charge or storage of the battery employing this material is large.

A positive electrode active material for a non-aqueous electrolyte secondary battery according to the present disclosure includes lithium transition metal oxide particles, a metal compound containing a metal element M and adhering to surfaces of the lithium transition metal oxide particles, and a lithium metal compound containing lithium (Li) and the metal element M and adhering to the surfaces of the lithium transition metal oxide particles. The metal element M is at least one selected from among aluminum (Al), titanium (Ti), manganese (Mn), gallium (Ga), molybdenum (Mo), tin (Sn), tungsten (W), and bismuth (Bi).

A method for producing a positive electrode active material for a non-aqueous electrolyte secondary battery according to the present disclosure includes the steps of calcining a mixture of a lithium compound and a transition metal oxide to synthesize lithium transition metal oxide particles, and heat-treating a mixture of the unwashed lithium transition metal oxide particles and a metal compound containing a metal element M at a temperature lower than a temperature in the calcining.

A non-aqueous electrolyte secondary battery according to the present disclosure includes a positive electrode containing the positive electrode active material, a negative electrode, and a non-aqueous electrolyte.

According to the present disclosure, a non-aqueous electrolyte secondary battery with which the amount of gas generated during charge or storage or the like is small even without washing lithium transition metal oxide particles can be provided.

BRIEF DESCRIPTION OF DRAWING

FIG. 1 is a sectional view of an illustrative non-aqueous electrolyte secondary battery of an embodiment.

DESCRIPTION OF EMBODIMENTS

As described above, in order to suppress generation of gas during charge or storage of a non-aqueous electrolyte secondary battery or the like, it is necessary to wash lithium transition metal oxide particles to remove surplus lithium present on the surfaces of the particles. If surplus lithium is present on the surfaces of the lithium transition metal oxide particles, lithium carbonate is generated on the surfaces of the particles, and this lithium carbonate is considered to react with the electrolyte solution to generate gas.

The present inventors have carried out earnest investigations to provide a battery with which the amount of gas generated during charge or storage or the like is small even without washing lithium transition metal oxide particles. Consequently, the present inventors have succeeded in solving the problem by adding a compound containing a specific metal element to the unwashed lithium transition metal oxide particles (hereinafter also referred to as "unwashed particles").

In a positive electrode active material according to the present disclosure in which the compound containing a specific metal element has been adhered to the surfaces of the unwashed particles, surplus lithium present on the surfaces of the unwashed particles reacts with the compound to generate a lithium metal compound, so that the amount of surplus lithium, which causes generation of gas, greatly decreases. Hence, a non-aqueous electrolyte secondary battery with which the amount of gas generated during charge or storage or the like is small even without washing the lithium transition metal oxide particles can be provided.

An example of an embodiment will be described in detail.
A drawing referred to in the Description of Embodiment is in schematic form, and specific dimensional ratios and the like should be determined in consideration of the description below. A cylindrical battery in which a cylindrical battery case houses an electrode assembly 14 with a wound structure is illustrated below as an example, but the structure of the electrode assembly is not limited to the wound structure.

A laminated structure formed by alternately laminating a plurality of positive electrodes and a plurality of negative electrodes with separators therebetween may be employed. Moreover, the battery case is not limited to a cylindrical shape. Examples of the case include rectangular (for rectangular batteries) and coin-shaped (for coin cells) metal cases, resin cases (for laminate batteries) constituted of resin films.

FIG. 1 is a sectional view of an illustrative non-aqueous electrolyte secondary battery 10 of the embodiment. As illustrated in FIG. 1, the non-aqueous electrolyte secondary battery 10 includes the electrode assembly 14, a non-aqueous electrolyte (not shown), and the battery case that houses the electrode assembly 14 and the non-aqueous electrolyte. The electrode assembly 14 has a wound structure in which a positive electrode 11 and a negative electrode 12 are wound together with a separator 13 therebetween. The battery case is constituted of a closed-end cylindrical case body 15 and a sealing assembly 16 that blocks the opening of the body.

The non-aqueous electrolyte secondary battery 10 includes insulating plates 17 and 18 respectively disposed on the upper and lower sides of the electrode assembly 14. In the example shown in FIG. 1, a positive electrode lead 19 attached to the positive electrode 11 passes through a through-hole of the insulating plate 17 and extends toward the sealing assembly 16, and a negative electrode lead 20 attached to the negative electrode 12 extends on the bottom side of the case body 15 along the outside of the insulating plate 18. The positive electrode lead 19 is connected to the lower surface of a filter 22, which is the bottom board of the sealing assembly 16, by welding or the like, and a cap 26, which is the top board of the sealing assembly 16, electrically connected to the filter 22 serves as a positive terminal. The negative electrode lead 20 is connected to the inner surface of the bottom of the case body 15 by welding or the like, and the case body 15 serves as a negative terminal.

The case body 15 is, for example, a closed-end cylindrical metal container. A gasket 27 is disposed between the case body 15 and the sealing assembly 16 to ensure that the battery case is tightly sealed. The case body 15 includes a projecting portion 21 formed by, for example, pressing the lateral surface from outside to support the sealing assembly 16. The projecting portion 21 is preferably formed annularly along the circumferential direction of the case body 15, and the upper surface of the projecting portion 21 supports the sealing assembly 16.

The sealing assembly 16 includes the filter 22, a lower vent member 23, an insulating member 24, an upper vent member 25, and the cap 26 stacked in this order from the electrode assembly 14 side. Each of the members constituting the sealing assembly 16 has, for example, a disk or ring shape, and the members other than the insulating member 24 are electrically connected to each other. Each of the central portions of the lower vent member 23 and the upper vent member 25 are connected to each other, and the insulating member 24 is disposed between each of the peripheral portions. If the internal pressure of the battery increases due to overheating, for example, the lower vent member 23 ruptures, and the upper vent member 25 thus bulges toward the cap 26 and comes off the lower vent member 23, thereby breaking the electrical connection between the valves. If the internal pressure further increases, the upper vent member 25 ruptures, and gas is discharged from the opening of the cap 26.

The following describes each of the components, particularly a positive electrode active material, of the non-aqueous electrolyte secondary battery 10 in detail.

[Positive Electrode]

The positive electrode includes a positive collector and a positive electrode mixture layer formed on the positive collector. Foil of a metal, such as aluminum, that is stable in the electric potential range of the positive electrode, a film with the above metal disposed in the outer layer, and the like can be used for the positive collector. The positive electrode mixture layer contains the positive electrode active material, an electrical conductor, and a binder. The positive electrode can be produced by, for example, applying a positive electrode mixture slurry containing the positive electrode active material, the electrical conductor, the binder, and other components over the positive collector, drying the coating film, and rolling the product to form positive electrode mixture layers on both surfaces of the collector.

The positive electrode active material contains lithium transition metal oxide particles, a metal compound (hereinafter referred to as a "metal compound M1") containing a metal element M and adhering to the surfaces of the lithium transition metal oxide particles, and a lithium metal compound (hereinafter referred to as a "lithium metal compound M2") containing lithium (Li) and the metal element M and adhering to the surfaces of the lithium transition metal oxide particles. The positive electrode active material is produced using unwashed lithium transition metal oxide particles. That is, the production process of the positive electrode active material does not include either a step of washing with water to remove surplus Li after the synthesis of the lithium transition metal oxide particles or steps of filtration and drying followed by the washing step. Preferably, almost no surplus Li is present on the surfaces of the lithium transition metal oxide particles to which the metal compound M1 and the lithium metal compound M2 have adhered.

The content (proportion of the mass of the lithium transition metal oxide particles to the positive electrode active material) of the lithium transition metal oxide particles in the positive electrode active material is preferably 80% by mass or more, more preferably 90% by mass or more, particularly preferably 95% by mass or more, in view of ensuring of the battery capacity and the like. The metal compound M1 and the lithium metal compound M2 are fine particles having particle diameters smaller than the particle diameter of the lithium transition metal oxide particles and are scattered over the surfaces of the lithium transition metal oxide particles. Hence, the particle diameter of the positive electrode active material is determined by the particle diameter of the lithium transition metal oxide particles (the particle diameter of the positive electrode active material the particle diameter of the lithium transition metal oxide particles).

The average particle diameter of the lithium transition metal oxide particles is, for example, 2 to 30 μm, preferably 5 to 15 μm. The lithium transition metal oxide particles may be secondary particles formed by agglomeration of primary particles measuring 100 nm to 10 μm. The average particle diameter of the lithium transition metal oxide particles means the median diameter (D50) measured by laser diffraction method and can be measured using, for example, a laser diffraction/scattering particle size distribution analyzer manufactured by HORIBA, Ltd.

The lithium transition metal oxide constituting the lithium transition metal oxide particles contains, for example, at least one metal element selected from among magnesium (Mg), aluminum (Al), calcium (Ca), scandium (Sc), titanium (Ti), vanadium (V), chromium (Cr), manganese (Mn), iron (Fe), cobalt (Co), nickel (Ni), copper (Cu), zinc (Zn), gallium (Ga), germanium (Ge), yttrium (Y), zirconium (Zr), tin (Sn), antimony (Sb), lead (Pb), and bismuth (Bi). Among these elements, at least one selected from among Ni, Co, Mn, and Al is preferably contained.

A suitable lithium transition metal oxide is an oxide in which the proportion of Ni to the total number of moles of metal elements other than Li is 30 mol % or more, more preferably 85 mol % or more. The lithium transition metal oxide contains mainly, for example, an oxide represented by the composition formula $Li_aNi_xM^*_{(1-x)}O_2$ (where $0.95 \leq a \leq 1.2$, $0.85 \leq x \leq 1.0$, and M* includes at least Co and Al). The lithium transition metal oxide particles may contain a mixture of two or more lithium transition metal oxides having different compositions. The particles preferably contain at least 50% by mass or more, or 80% by mass or more, preferably substantially 100% by mass, of the oxide represented by the above composition formula.

As described above, the metal compound M1 is a compound containing the metal element M and has adhered to the surfaces of the lithium transition metal oxide particles. Part of the metal compound M1 may fall off the surfaces of the lithium transition metal oxide particles and be present in the positive electrode mixture layer. By causing the metal compound M1 to adhere to the surfaces of the unwashed lithium transition metal oxide particles, surplus Li, which causes generation of gas during charge or storage of the battery or the like, can be made harmless. The metal compound M1 reacts with Li present on the surfaces of the lithium transition metal oxide particles to form the lithium metal compound M2. That is, the presence of the metal compound M1 means that almost no surplus Li is left on the surfaces of the lithium transition metal oxide particles.

The amount of the surplus Li compound on the surfaces of the lithium transition metal oxide particles is 0.2 to 4 mol %, preferably 0 to 4 mol % with respect to the lithium transition metal oxide. The amount of the surplus Li compound on the surfaces of the lithium transition metal oxide particles can be determined by, for example, immersing the positive electrode active material powder in water to dissolve the surplus Li compound and titrating the resulting solution.

The metal element M contained in the metal compound M1 is at least one selected from among aluminum (Al), titanium (Ti), manganese (Mn), gallium (Ga), molybdenum (Mo), tin (Sn), tungsten (W), and bismuth (Bi). Only in the case where the metal element M is at least one of these elements, generation of gas during charge or storage or the like is suppressed without causing defects such as decrease in the capacity. Among these elements, the metal element M is preferably at least one selected from the group consisting of Al, Ga, Sn, and W, the group consisting of Al, Ga, and Sn, or the group consisting of Al and Ga.

Specific examples of the metal compound M1 include oxides of the metal element M, such as aluminum oxide, gallium oxide, tin oxide, and tungsten oxide; nitrides of the metal element M, such as aluminum nitride and gallium nitride; hydroxides of the metal element M, such as aluminum hydroxide and gallium hydroxide, and the like. As the metal compound M1, one compound may be used singly, or a combination of two or more compounds may be used. One or more oxides are preferably used.

The content of the metal compound M1 in the positive electrode active material is, for example, less than 4 mol %, preferably less than 0.2 mol %, with respect to the amount of the positive electrode active material. The content of the metal compound M1 is preferably lower than the content of the lithium metal compound M2.

As described above, the particle diameter of the metal compound M1 is smaller than the particle diameter of the lithium transition metal oxide particles. The average particle diameter of the metal compound M1 adhering to the surfaces of the lithium transition metal oxide particles can be measured using a scanning electron microscope (SEM) (the lithium metal compound M2 can be measured in the same manner). Specifically, 100 metal compound M1 particles are randomly selected from an SEM image of the lithium transition metal oxide particles (positive electrode active material) to the surfaces to which the metal compound M1 has adhered, the maximum diameters of each of the selected particles are measured, and the measured values are averaged to produce the average particle diameter. The average particle diameter of the metal compound M1 measured in accordance with this method is, for example, 50 nm to 3 μm, preferably 100 nm to 1 μm.

As described above, the lithium metal compound M2 is an oxide containing Li and the metal element M and has adhered to the surfaces of the lithium transition metal oxide particles. Here, part of the lithium metal compound M2 may fall off the surfaces of the lithium transition metal oxide particles and be present in the positive electrode mixture layer. The lithium metal compound M2 is generated by the reaction of the surplus Li compound present on the surfaces of the lithium transition metal oxide particles with the metal compound M1. The lithium metal compound M2 has a low reactivity with the electrolyte solution and does not cause generation of gas during charge or storage or the like.

Specific examples of the lithium metal compound M2 include complex oxides of Li and the metal element M, such as lithium aluminate, lithium gallium oxide, lithium stannate, and lithium tungstate; and complex nitrides of Li and the metal element M, such as lithium aluminum nitride and lithium gallium nitride. Two or more lithium metal compounds M2 may be present, and preferably contain one or more oxides.

An amount of the lithium metal compound M2 adhering to the surfaces of the lithium transition metal oxide particles is larger than an amount of the metal compound M1 adhering to the surfaces of the lithium transition metal oxide particles. The content of the lithium metal compound M2 in the positive electrode active material is, for example, 0.2 to 4 mol % with respect to the amount of the positive electrode active material.

As described above, the particle diameter of the lithium metal compound M2 is smaller than the particle diameter of the lithium transition metal oxide particles. The average particle diameter of the lithium metal compound M2 adhering to the surfaces of the lithium transition metal oxide particles is, for example, 50 nm to 3 μm, preferably 100 nm to 1 μm. The average particle diameter of the lithium metal compound M2 is about the same as the average particle diameter of the metal compound M1.

The above positive electrode active material can be obtained through, for example, a production process including a step (hereinafter referred to as "Step (1)") of calcining a mixture of the lithium compound and a transition metal oxide to synthesize the lithium transition metal oxide particles, and a step (hereinafter referred to as "Step (2)") of heat-treating a mixture of the unwashed lithium transition metal oxide particles and the metal compound M1 at a temperature lower than a calcining temperature in Step (1). Although the surplus Li compound is present on the surfaces of the unwashed lithium transition metal oxide particles (unwashed particles), the heat treatment after adding the metal compound M1 allows the surplus Li compound to react with the metal compound M1 to generate the lithium metal compound M2, thereby greatly reducing the surplus Li compound, which causes generation of gas. This production process does not require either washing of the lithium transition metal oxide particles or the steps of filtration and drying followed by the washing step. Accordingly, the production costs of the positive electrode active material, the environmental load and the like can be reduced.

Examples of the lithium compound used in Step (1) include lithium hydroxide, lithium carbonate, lithium nitrate, and the like. Examples of the transition metal oxide include complex oxides (such as nickel cobalt aluminum oxide and nickel cobalt manganese oxide) each containing at least one selected from among Ni, Co, Mn, and Al, and the like. Since part of Li is lost by volatilization during the calcination as described above, more excessive Li (lithium compound) than in the stoichiometric ratio to a target product is used. Hence, surplus Li is present on the surfaces of the calcined product particles (lithium transition metal oxide particles).

The calcining temperature in Step (1) is preferably higher than 700° C. A suitable range of the calcining temperature is 720 to 900° C., more preferably 730 to 800° C. The calcination is preferably performed in an oxygen flow.

In Step (2), the lithium transition metal oxide particles obtained in Step (1) are used in the unwashed form. The metal compound M1 is mixed at a ratio of, for example, 20 to 600 µmol/g to the unwashed particles to cause the metal compound M1 fine particles to adhere to the surfaces of the unwashed particles. The resulting mixture is then heat-treated, so that Li and the metal compound M1 present on the surfaces of the unwashed particles react together to generate the lithium metal compound M2. Thus, the positive electrode active material in which the fine particles of the metal compound M1 and the lithium metal compound M2 have adhered to the surfaces of the lithium transition metal oxide particles is obtained.

Examples of the method for causing the metal compound M1 to adhere to the surfaces of the unwashed particles include a method of mechanically mixing the unwashed particles with the metal compound M1. Alternatively, the metal compound M1 may be caused to adhere to the surfaces of the unwashed particles by preparing a water dispersion in which the metal compound M1 is dispersed in water and spraying or dropping the dispersion on the unwashed particles. In this case, the metal compound M1 is apt to uniformly adhere to the surfaces of the unwashed particles, and the metal compound M1 is apt to react with Li.

The heat treatment temperature in Step (2) is lower than the calcining temperature in Step (1) and is preferably 200 to 700° C., more preferably 300 to 500° C. If the heat treatment temperature is within the above range, the reaction of the metal compound M1 with Li in the lithium transition metal oxide crystals can be suppressed while ensuring a sufficient reactivity of the metal compound M1 with surplus Li.

Examples of the electrical conductor contained in the positive electrode mixture layer include carbon materials such as carbon black, acetylene black, Ketjenblack, and graphite. Examples of the binder include fluorocarbon resins such as polytetrafluoroethylene (PTFE) and poly(vinylidene fluoride) (PVdF); polyolefins such as ethylene-propylene-isoprene copolymers and ethylene-propylene-butadiene copolymers; polyacrylonitrile (PAN); polyimides; acrylic resins, and the like. These resins may be combined with carboxymethyl cellulose (CMC) or its salts, poly(ethylene oxide) (PEO), or the like. One of these substances may be used singly, or a combination of two or more substances may be used.

[Negative Electrode]

The negative electrode includes a negative collector and a negative electrode mixture layer formed on the collector. Foil of a metal, such as copper, that is stable in the electric potential range of the negative electrode, a film with the above metal disposed in the outer layer, and the like can be used for the negative collector. The negative electrode mixture layer contains a negative electrode active material and a binder. The negative electrode can be produced by, for example, applying a negative electrode mixture slurry containing the negative electrode active material, the binder, and other components over the negative collector, drying the coating film, and rolling the product to form negative electrode mixture layers on both surfaces of the collector.

The negative electrode active material is not particularly limited as long as the material can reversibly occlude and release lithium ions. Examples of the material include carbon materials such as natural graphite and artificial graphite; metals, such as silicon (Si) and tin (Sn), that forms alloys with Li; oxides containing metal elements such as Si and Sn, and the like. As the negative electrode active material, one of these substances may be used singly, or a combination of two or more substances may be used.

Similarly to the case of the positive electrode, a fluorocarbon resin, PAN, a polyimide, an acrylic resin, a polyolefin, or the like can be used as the binder. In the case where the mixture slurry is prepared using an aqueous solvent, CMC or its salts, styrene-butadiene rubber (SBR), poly(acrylic acid) (PAA) or its salts, poly(vinyl alcohol), and the like are preferably used.

[Separator]

An ion-permeable and insulating porous sheet is used as the separator. Specific examples of the porous sheet include microporous thin films, woven fabric, nonwoven fabric, and the like. Suitable examples of the material for the separator include olefin resins such as polyethylene and polypropylene, cellulose and the like. The separator may have a single layer structure or a laminated structure.

[Non-Aqueous Electrolyte]

The non-aqueous electrolyte contains a non-aqueous solvent and an electrolyte salt dissolved in the non-aqueous solvent. For example, Esters, ethers, nitriles such as acetonitrile, amides such as dimethylformamide, and mixed solvents of two or more of these solvents can be used for the non-aqueous solvent. The non-aqueous solvent may contain a halogen substitution product formed by substituting halogen atoms such as fluorine for at least part of hydrogen of the above solvent. Moreover, the non-aqueous electrolyte is not limited to liquid electrolytes (non-aqueous electrolyte solutions) but may be a solid electrolyte employing a gel polymer and the like.

Examples of the above esters include cyclic carbonate esters such as ethylene carbonate (EC), propylene carbonate (PC), and butylene carbonate; chain carbonate esters such as dimethyl carbonate (DMC), methyl ethyl carbonate (MEC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate, and the like.

Examples of the above ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether, and the like.

Fluorinated cyclic carbonate esters such as fluoroethylene carbonate (FEC), fluorinated chain carbonate esters, and fluorinated chain carboxylate esters such as methyl fluoropropionate (FMP) and the like are preferably used as the halogen substitution product.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_6$, $(C_nF_{2n+1})_x$ (where $1<x<6$, and n is 1 or 2), $LiB_{10}Cl_{10}$, LiCl, LiBr, LiI, chloroborane lithium, lithium short-chain aliphatic carboxylates, borate salts such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ (where l and m are integers of 1 or more), and the like. One of these lithium salts may be used singly, or a mixture of a plurality of salts may be used. Among these salts, $LiPF_6$ is preferably used in view of ionic conductivity, electrochemical stability and the like. The concentration of the lithium salt is preferably 0.8 to 1.8 mol per 1 L of the non-aqueous solvent.

EXAMPLES

The following further describes the present disclosure on the basis of Examples, but the present disclosure is not limited to these Examples.

Example 1

[Production of Positive Electrode Active Material]

Nickel cobalt aluminum oxide represented by $LiNi_{0.91}Co_{0.06}Al_{0.03}O_2$ and lithium hydroxide (LiOH) were mixed at a molar ratio of 1:1.03, and the mixture was calcined at 745° C. for 20 hours in an oxygen flow. Tungsten oxide ($WO_3$) was added to and mixed with the unwashed calcined product at a ratio of 161 μmol per 1 g of the calcined product, and the mixture was then heat-treated at 400° C. for 3 hours in an oxygen flow to provide a positive electrode active material.

[Production of Positive Electrode]

The above positive electrode active material, acetylene black, and poly(vinylidene fluoride) were mixed at a mass ratio of 100:1.25:1, and an appropriate amount of N-methyl-2-pyrrolidone (NMP) was added to adjust the viscosity, so that a positive electrode mixture slurry was prepared. Subsequently, the positive electrode mixture slurry was applied over one surface of a positive collector made of aluminum foil, and the coating film was dried on a hot plate at 80° C. The collector on which the coating film was formed was compressed using a roller so that the density of the coating film (positive electrode mixture layer) would be 3 g/cc, and the product was cut into a predetermined electrode size, so that a positive plate in which positive electrode mixture layers were formed on both surfaces of the positive collector was produced.

[Production of Negative Electrode]

Graphite powder, styrene-butadiene rubber (SBR), and carboxymethyl cellulose were mixed at a mass ratio of 100:1:1, and an appropriate amount of water was added to adjust the viscosity, so that a negative electrode mixture slurry was prepared. Subsequently, the negative electrode mixture slurry was applied over one surface of a negative collector made of copper foil, and the coating film was dried on a hot plate at 80° C. The collector on which the coating film was formed was compressed using a roller, and the product was cut into a predetermined electrode size, so that a negative plate in which negative electrode mixture layers were formed on both surfaces of the negative collector was produced.

[Preparation of Non-Aqueous Electrolyte]

Ethylene carbonate (EC) and methyl ethyl carbonate (MEC) were mixed at a volume ratio of 3:7. Lithium hexafluorophosphate ($LiPF_6$) was dissolved in the mixed solvent at a concentration of 1 mol/L to prepare a non-aqueous electrolyte.

[Production of Battery]

The above positive plate provided with an aluminum lead and the above negative plate provided with a nickel lead were spirally wound together with a polyethylene separator therebetween to produce a wound electrode assembly. The electrode assembly was inserted into a package constituted of an aluminum laminated sheet and dried at 105° C. for 2 hours in vacuum, and the above non-aqueous electrolyte was injected into the package. The package housing the electrode assembly and the non-aqueous electrolyte was sealed to produce a battery A1.

Charge/discharge tests and a storage test were performed on the battery A1. Tables 1 and 2 show the respective evaluation results (the same applies to Examples and Comparative Examples below).

[Charge/Discharge Tests]

Constant-current charge was performed to 4.2 V at 0.1 C, and constant-voltage charge was then performed at 4.2 V until the current value became equivalent to 0.01 C to complete the charge process. After a 10 minutes' pause, constant-current discharge was performed to 2.5 V at 0.1 C. After a 5 minutes' pause, constant-current discharge was performed to 2.5 V at 0.05 C. After another 5 minutes' pause, constant-current discharge was performed to 2.5 V at 0.01 C to complete the discharge process. The duration of a pause between cycles was set to 10 minutes.

[Storage Test]

After two charge/discharge cycles described above, only the charge process for one cycle was performed, and the volume of the battery A1 was measured by the buoyancy method (Archimedes' method). Subsequently, a storage test was performed for 3 hours in a constant temperature oven at 85° C. The temperature of the battery A1 that had undergone the storage test was allowed to drop to room temperature, and the volume was then measured again by the buoyancy method. The difference between the volume before the storage test and the volume after the storage test was regarded as the amount of gas generated, and the amount was normalized to 1 g of the positive electrode active material.

Example 2

A battery A2 was produced in substantially the same manner as in Example 1 except that $WO_3$ was replaced with molybdenum oxide ($MoO_3$) in the production of the positive electrode active material.

Example 3

A battery A3 was produced in substantially the same manner as in Example 1 except that $WO_3$ was replaced with aluminum oxide ($Al_2O_3$) and that the amount of aluminum oxide added was 242 µmol per 1 g of the calcined product in the production of the positive electrode active material.

Comparative Example 1

A battery B1 was produced in substantially the same manner as in Example 1 except that $WO_3$ was not added and that the calcined product produced in Example 1 was used as it was as the positive electrode active material.

Comparative Example 2

A battery B2 was produced in substantially the same manner as in Example 3 except that $Al_2O_3$ was replaced with niobium oxide ($Nb_2O_5$) in the production of the positive electrode active material.

Comparative Example 3

A battery B3 was produced in substantially the same manner as in Example 1 except that $WO_3$ was replaced with boron oxide ($B_2O_3$) and that the amount of boron oxide added was 484 µmol per 1 g of the calcined product in the production of the positive electrode active material.

TABLE 1

|  | Metal compound M1 | Amount of Addition[*1] | Battery | Amount of gas generated[*2] |
|---|---|---|---|---|
| Comparative Example 1 | None | — | B1 | 0.874 |
| Example 1 | $WO_3$ | 161 | A1 | 0.683 |
| Example 2 | $MoO_3$ | 161 | A2 | 0.759 |
| Example 3 | $Al_2O_3$ | 242 | A3 | 0.742 |
| Comparative Example 2 | $Nb_2O_5$ | 242 | B2 | 1.179 |
| Comparative Example 3 | $B_2O_3$ | 484 | B3 | 1.169 |

[*1]The amount of addition per 1 g of the positive electrode active material (µmol/g)
[*2]The amount of gas generated per 1 g of the positive electrode active material (cc/g)

As shown in Table 1, the amount of gas generated from the batteries A1 to A3 in the Examples during the storage tests are all smaller than the amount of gas generated from the battery B1 in Comparative Example 1. In other words, the addition of $WO_3$, $MoO_3$, or $Al_2O_3$ is effective in suppressing generation of gas during the storage test. On the other hand, in the case where $Nb_2O_5$ or $B_2O_3$ was added (Comparative Examples 2 and 3), the amount of gas generated increased. Here, in the case where a compound containing Ga, which belongs to the same group as Al, is used, effects similar to the effects in the case where a compound such as $Al_2O_3$ containing Al is used are expected.

Example 4

A battery A4 was produced in substantially the same manner as in Example 1 except that $WO_3$ was replaced with bismuth oxide ($Bi_2O_3$), that the amount of bismuth oxide added was 484 µmol per 1 g of the calcined product in the production of the positive electrode active material, and a solution below was used as the non-aqueous electrolyte. A storage test was also performed on the battery A4 in the same manner as in Example 1. Table 2 shows the evaluation results (the same applies to Examples and Comparative Examples below).

[Preparation of Non-Aqueous Electrolyte]

EC, MEC, and dimethyl carbonate (DMC) were mixed at a volume ratio of 20:5:75. Lithium hexafluorophosphate ($LiPF_6$) was dissolved in the mixed solvent at a concentration of 1.4 mol/L, and 4% by mass of vinylene carbonate relative to the mass of the mixed solvent was added to prepare a non-aqueous electrolyte.

Example 5

A battery A5 was produced in substantially the same manner as in Example 4 except that $Bi_2O_3$ was replaced with tin oxide ($SnO_2$) in the production of the positive electrode active material.

Example 6

A battery A6 was produced in substantially the same manner as in Example 4 except that $Bi_2O_3$ was replaced with manganese oxide (MnO) in the production of the positive electrode active material.

Example 7

A battery A7 was produced in substantially the same manner as in Example 4 except that $Bi_2O_3$ was replaced with titanium oxide ($TiO_2$) in the production of the positive electrode active material.

Comparative Example 4

A battery B4 was produced in substantially the same manner as in Example 4 except that $Bi_2O_3$ was not added and that the calcined product produced in Example 1 was used as it was as the positive electrode active material.

Comparative Example 5

A battery B5 was produced in substantially the same manner as in Example 4 except that $Bi_2O_3$ was replaced with copper hydroxide ($Cu(OH)_2$) in the production of the positive electrode active material.

TABLE 2

|  | Metal compound | Amount of addition[*1] | Battery | Amount of gas generated[*2] |
|---|---|---|---|---|
| Comparative Example 4 | None | — | B4 | 1.45 |
| Example 4 | $Bi_2O_3$ | 484 | A4 | 1.13 |
| Example 5 | $SnO_2$ | 484 | A5 | 0.85 |
| Example 6 | MnO | 484 | A6 | 0.99 |
| Example 7 | $Ti_2O_2$ | 484 | A7 | 0.94 |
| Comparative Example 5 | $Cu(OH)_2$ | 484 | B5 | 1.79 |

[*1]The amount of addition per 1 g of the positive electrode active material (µmol/g)
[*2]The amount of gas generated per 1 g of the positive electrode active material (cc/g)

As shown in Table 2, the amounts of gas generated from the batteries A4 to A7 in the Examples during the storage tests are all smaller than the amount of gas generated from the battery B4 in Comparative Example 4. In other words, the addition of $Bi_2O_3$, $SnO_2$, MnO, or $TiO_2$ is effective in suppressing generation of gas during the storage test. On the other hand, in the case where $Cu(OH)_2$ was added (Comparative Example 5), the amount of gas generated increased.

INDUSTRIAL APPLICABILITY

The present invention can be applied to a positive electrode active material for non-aqueous electrolyte secondary batteries, a method for producing a positive electrode active material for non-aqueous electrolyte secondary batteries, and a non-aqueous electrolyte secondary battery.

REFERENCE SIGNS LIST

10 Non-aqueous electrolyte secondary battery
11 Positive electrode
12 Negative electrode
13 Separator
14 Electrode assembly
15 Case body
16 Sealing assembly
17, 18 Insulating plate
19 Positive electrode lead
20 Negative electrode lead
21 Projecting portion
22 Filter
23 Lower vent member
24 Insulating member
25 Upper vent member
26 Cap
27 Gasket

The invention claimed is:

1. A positive electrode active material for a non-aqueous electrolyte secondary battery, comprising:
    lithium transition metal oxide particles include a metal element M* and M* consists of at least one metal element from the group consisting of Mg, Al, Sc, Ti, V, Cr, Co, Ni, Cu, Zn, Ga, Ge, Y, Zr, Sn, Sb, Pb, and Bi;
    a metal oxide M1 comprising tungsten (W) and adhering to surfaces of the lithium transition metal oxide particles, wherein the metal oxide M1 lacks lithium (Li);
    a lithium metal oxide M2 is a complex metal oxide comprising lithium (Li), tungsten (W) and the metal element M*, the lithium metal oxide M2 adhering to the surfaces of the lithium transition metal oxide particles, and
    wherein an amount in mole percent of the lithium metal oxide M2 adhering to the surfaces of the lithium transition metal oxide particles is larger than an amount in mole percent of the metal oxide M1 adhering to the surfaces of the lithium transition metal oxide particles;
    wherein the content of M1 is less than 0.2 mol % and M2 is 0.2 to 4 mol %;
    wherein M1 and M2 are adhered by heat treatment to the surfaces of the lithium transition metal oxide particles; and, the heat treatment temperature is 300 to 500° C.;
    a metal oxide M3 comprising a metal element M,
    wherein the metal element M is at least one selected from among Al, Ti, Ga, Sn, and Bi;
    and M3 does not include Li.

2. The positive electrode active material according to claim 1, wherein the lithium transition metal oxide particles contain mainly an oxide represented by a composition formula $Li_aNi_xM^*_{(1-x)}O_2$, wherein $0.95 \leq a \leq 1.2$, $0.85 \leq x < 1.0$, and M* comprises at least Co and Al.

3. A non-aqueous electrolyte secondary battery comprising:
    a positive electrode comprising the positive electrode active material according to claim 1;
    a negative electrode; and
    a non-aqueous electrolyte.

4. The positive electrode active material according to claim 1,
    wherein the metal oxide M1 is tungsten oxide, and the lithium metal oxide M2 is lithium tungstate.

5. The positive electrode active material according to claim 1, further comprising:
    the metal oxide M3 comprising a metal element M, wherein the metal element M is at least one selected from among Ti, Ga, Sn, and Bi.

6. The positive electrode active material according to claim 1, further comprising:
    the metal oxide M3 comprising a metal element M, wherein the metal element M is Al.

* * * * *